United States Patent [19]

Sawada

[11] 4,279,967

[45] Jul. 21, 1981

[54] SOFT COPPER ALLOY CONDUCTORS AND THEIR METHOD OF MANUFACTURE

[75] Inventor: Kazuo Sawada, Abenomotomachi, Japan

[73] Assignee: Sumitomo Electric Industries, Ltd., Osaka, Japan

[21] Appl. No.: 143,114

[22] Filed: Apr. 23, 1980

Related U.S. Application Data

[62] Division of Ser. No. 1,955, Jan. 8, 1979, Pat. No. 4,233,067.

[30] Foreign Application Priority Data

Jan. 19, 1978 [JP] Japan .................................. 53-5070
Jan. 20, 1978 [JP] Japan .................................. 53-5530

[51] Int. Cl.[3] ............................................ B32B 15/20
[52] U.S. Cl. .................................... 428/647; 428/644
[58] Field of Search ....................... 428/647, 929, 644; 148/11.5 C, 11.5 Q, 12.7 C, 13.2, 32; 75/153

[56] References Cited

U.S. PATENT DOCUMENTS

| | | | |
|---|---|---|---|
| 990,040 | 4/1911 | Franke | 75/153 |
| 1,169,392 | 1/1916 | Frary | 75/153 |
| 2,202,150 | 5/1940 | Hensel et al. | 75/153 |
| 2,741,019 | 4/1956 | Faust | 428/644 |
| 3,892,637 | 7/1975 | Polti | 428/647 |
| 4,059,437 | 11/1977 | Nesslage et al. | 148/11.5 C |
| 4,118,256 | 10/1978 | Schmitt-Thomas | 75/153 |

FOREIGN PATENT DOCUMENTS

| | | | |
|---|---|---|---|
| 2062939 | 7/1971 | Fed. Rep. of Germany | 75/153 |
| 2730625 | 1/1979 | Fed. Rep. of Germany | 428/647 |
| 5016432 | 2/1977 | Japan | 428/647 |
| 359286 | 1/1973 | U.S.S.R. | 75/153 |

*Primary Examiner*—Peter K. Skiff
*Attorney, Agent, or Firm*—Carothers and Carothers

[57] ABSTRACT

Soft copper alloy conductors having a 0.2% proof stress of 12 $kg/mm^2$ or less which contains 5–200 p.p.m. of calcium, the balance substantially consisting of copper, and hot-dip coated copper alloy conductors made by coating the surface of copper alloy conductors of said composition with tin or lead or their alloy by hot-dipping, and a method of manufacturing said copper alloy conductors.

4 Claims, No Drawings

SOFT COPPER ALLOY CONDUCTORS AND THEIR METHOD OF MANUFACTURE

CROSS REFERENCE TO RELATED APPLICATION

This is a division of patent application Ser. No. 1,955 filed Jan. 8, 1979, now U.S. Pat. No. 4,233,067, for Soft Copper Alloy Conductors And Their Method of Manufacture.

BACKGROUND OF THE INVENTION

The present invention relates to copper alloy conductors and their method of manufacture. More particularly, it relates to soft copper alloy conductors which are of a high electric conductivity and which have a softness and are useful soft copper alloy conductors for use as magnet wires, conductors for various types of machines and appliances, lead wires, etc. and to their method of manufacture.

Regarding magnet wires which are used in motors, transformers, etc., the requirements for good windability, little deformation after winding, etc. have become more severe as the compactness and high performance of such electrical machines and appliances have come to be demanded more and more. From this point of view, the softness of the conductors themselves is of very great importance, while improvement on the surface smoothness of enamel, i.e. the insulator of the wires, is also wanted at the same time.

For use as such magnet wires or the like wherein softness is a requisite property, a conductor material which, as compared with the tough-pitch copper and oxygen-free copper that have been heretofore in use, is more readily softened and produces a good softness easily, almost without any decrease in electric conductivity.

In recent years, on the other hand, the development of electronic machines and appliances has given rise to a tendency that conductors which have previously been coated with tin, lead or solder or the like have come to be used more and more as electric conductors and lead wires for the wirings inside and outside of such machines and appliances with a view to obtaining better solderability at the time of wiring and assembling work.

As material for such conductors, annealed tough-pitch copper wire has usually been greatly used heretofore. The coating treatment of such conductors is carried out by hot-dipping or electroplating.

The hot-dipping method is often found to be a preferable plating method for the plating of such metals with a low melting point as those already mentioned.

The reasons for this are that it is possible to make the plating at a high speed with comparatively simple equipment and that an annealed material is often considered desirable for the finished product and, in the case of conductors of a comparatively small diameter, conductors of a cold worked material becomes annealed by the heat applied to the conductors while they pass through the trough of the molten metal while their surface is coated with the coating metal at the same time, so that an annealing process in particular may be dispensed with in many cases.

In this connection, the present inventor has discovered from experience that in production on an industrial scale, problems occur such as the conductors are passed through the trough at a considerably high speed out of consideration of production efficiency and that if they are passed at a low speed, the conductors may get dissolved in the molten coating metal and detrimentally affect the properties of the coating metal or an intermetallic compound may be produced between the coating metal and the conductors which results in brittleness.

Furthermore, it has become more frequent in recent years to carry out solder coating. Since the melting point of solder is lower than those of tin and lead, the temperature of molten solder can be made lower than that of tin and lead, and a lower temperature is preferable for the purpose of preventing the properties of the molten metal from being deteriorated by the dissolving of the conductors in the melt trough and also for the purpose of energy saving. However, the condition at the present time is that the temperature of the molten metal is not lowered very much because of the consideration of the annealing of core conductors.

Circumstances being as mentioned above, hot-dip coated soft conductors which are manufactured by taking full advantage of the characteristic feature of the afore-mentioned plating by hot dipping without lowering the electric conductivity and without having the properties deteriorated by the formation of an intermetallic compound between the coating metal and the conductors and which can be manufactured more easily than conductors heretofore manufactured by plating tough-pitch copper conductors with tin, lead or solder are eagerly wanted. That is to say, hot-dip coated soft conductors which can be annealed during the dipping in the plating bath even if the heating duration is short and the temperature of the melt bath is lower as already mentioned are eagerly wanted.

SUMMARY OF THE INVENTION

The present invention relates to soft copper alloy conductors that satisfy the afore-mentioned demand and their method of manufacture.

An object of the present invention is to provide, for use as the afore-mentioned magnet wires and others of which softness is required, conductors of copper alloy which show almost no reduction in electric conductivity as compared with the tough-pitch copper and oxygen-free copper heretofore in use and which is easy to soften and readily produces a softness of the conductors, and their method of manufacture.

Another object of the present invention is to provide soft conductors coated with tin, lead or their alloy by hot dipping which can be manufactured more easily than the hot-dip coated tough-pitch copper conductors heretofore manufactured without lowering the electric conductivity, and without having the properties deteriorated by the formation of an intermetallic compound between said metals, and a method of manufacturing such conductors.

Another object of the present invention is to provide a manufacturing method which makes it possible to dispense with the annealing process before the hot-dipping coating when manufacturing hot-dip coated soft copper conductors.

In the case of the hot-dip coating of tough-pitch copper conductors heretofore in use, conductors which could be softened during the immersion in the plating trough on an industrial scale and did not require an annealing process before the plating, were limited only to those of an extremely small diameter which enables the central portion to be fully heated in a short time. Another object of the present invention is to provide a manufacturing method which makes it possible to enhance this limitation on conductor diameter.

The conductors of the present invention are soft copper alloy conductors having a 0.2% proof stress of 12 kg/mm$^2$ or less which are characterized in that they contain 5–200 p.p.m. of calcium, the balance being substantially copper, and hot-dip coated copper alloy conductors which are characterized in that the surface of copper alloy conductors of said composition is coated with tin, lead or their alloy by hot-dipping.

Also, the manufacturing method of the present invention is a method of manufacturing soft copper alloy conductors of said composition and hot-dip coated copper alloy conductors under appropriate processing conditions.

DETAILED DESCRIPTION OF THE INVENTION

Nothing difficult will occur in carrying out the present invention if the oxygen contained in the copper used according to the present invention is in a range that does not exceed 400 p.p.m. However, if its quantity is too large, it is apt to give rise to a problem wherein the yields of calcium become worse. On the other hand, if it is too small, electric conductivity is apt to be lowered by such elements contained in trace amounts as Fe, Sn, Pb, Co, Ni, Bi, Si, As and Sb, so that it may become necessary to use only a raw material of copper of high purity and therefore be found uneconomical. Furthermore, if the oxygen-content is to be made extremely small in the melting and casting processes in an ordinary atmosphere, it is necessary to use a large quantity of a deoxydizing gas or deoxydizing agent. Also, if the oxygen-content is small, casting defects are liable to take place. For these reasons, it is preferable for ordinary uses that the content is in the range of 30–400 p.p.m.

The reason why the present invention prescribes the calcium-content to be 5–200 p.p.m. is that if the calcium-content is less than 5 p.p.m., it will be difficult to obtain conductors which are softer than those of tough-pitch copper or oxygen-free copper heretofore in use, while if it is contained in excess of 200 p.p.m., it will not be more effective for the lowering of softening temperature and the improvement of softness, but may rather heighten the softening temperature or decrease the softness and may also result in a lower electric conductivity.

Next, the method of manufacturing soft copper alloy conductors according to the present invention is a method which is characterized in that the afore-mentioned copper alloy which contains 5–200 p.p.m. of calcium and the balance substantially of copper is subjected to a final cold-working of 95% or more in area reduction and is then subjected to annealing.

For lowering the softening temperature effectively as compared with that for the ordinary tough-pitch copper or oxygen-free copper, it is more effective in this method that the ratio of reduction in area by the cold working which precedes the treatment for the purpose of softening the conductors after cold working or the process of annealing which includes this treatment is made to be 95% or more. If the reduction in area by the cold working is less than 95%, it is frequently feared that the effect of bringing about the property of easier softening as compared with the ordinary tough-pitch copper may not be fully displayed.

Next, the method of manufacturing hot-dip coated soft copper alloy conductors according to the present invention is a method which is characterized in that the conductor surface of copper alloy conductors, which are made of the aforementioned copper alloy which contains 5–200 p.p.m. of calcium and the balance substantially of copper and which have been subjected to cold working preferably of a reduction in area of 95% or more, is coated by hot-dipping with tin, lead or their alloy, and thereby the preceding annealing process is omitted.

Copper alloy of the afore-mentioned composition used for the method of the present invention makes it possible to alleviate the heating conditions required for softening as compared with the ordinary tough-pitch copper and oxygen-free copper. Consequently, as its surface is coated by hot-dipping with tin, lead or their alloy, the conductors are easily softened merely by dipping in the hot melt trough without a previous process of softening. Because of this, it is easy to obtain soft conductors by hot dip coating even under the conditions of the afore-mentioned higher speed coating and the temperature condition of the metal melt bath, which is desired to have a lower temperature. The softening process before the hot dip coating can be omitted also in the case of conductors having a larger diameter. The manufacturing method has such advantages.

In the case of the present invention, what is mentioned as an alloy of tin and lead, which are the coating metals, refers to an alloy of which the principal component is substantially tin and/or lead, and there is nothing objectionable at all for the working of the present invention even if such alloying elements or impurities as indium, antimony, bismuth, cadmium, etc. are contained therein.

In addition, in case tin and/or lead alloy are used as the plating metal in the present invention, it is possible to soften the cold-drawn wires even if the temperature of the molten alloy is made to be in a range not below its melting point at that composition and not above 250° C., and the dipping duration made to be 0.5 second or less. This is desirable for the purpose of preventing deterioration of the plating metal.

Now, the present invention will be explained in further detail with reference to examples of embodiment.

EXAMPLE 1

A Cu-Ca alloy ingot, 140 mm×140 mm×3000 mm, was made in the following way: The ordinary ground metal of copper for electrical purposes was melted at approximately 1150° C. in a reverberatory furnace and subjected to the oxydizing treatment and thereafter the reducing treatment; and after the oxygen-content was thus made to be approximately 500 p.p.m., calcium was added in the form of Cu-2%Ca master alloy; and after stirring, it was cast semi-continuously with a metal mold in use.

Ingots were made likewise by semi-continuous casting also in the case of tough-pitch copper, oxygen-free copper and the example for comparison shown in Table 1 for the sake of comparison.

In continuation to the above, these ingots were given heat treatment at 800° C. for 1.5 hours, and then hot-rolled into wire rods of 8 mm diameter. The results of analysis of these wire rods are shown in Table 1.

Various characteristic values measured at room temperature after drawing the wire rods obtained in the above-mentioned way down to 0.45 mm diameter without an intermediate annealing process and then heating them for 30 minutes in oil baths of various temperatures are shown in Table 2.

TABLE 1

| Kind | Analytic values (ppm) Ca | Fe | Ag | Sn | Pb | Ni | Co | As | Bi | Sb | O |
|---|---|---|---|---|---|---|---|---|---|---|---|
| Present Invention 1 | 46 | 1 | 2 | 1 | 1 | 1 | 1 | 1 | <1 | 1 | 203 |
| Present Invention 2 | 53 | 14 | 3 | 8 | 5 | 3 | 2 | 2 | <1 | 2 | 56 |
| Present Invention 3 | 120 | 5 | 3 | 4 | 2 | 2 | 3 | 1 | <1 | 1 | 181 |
| Prior art 1 | — | 1 | 2 | 1 | 1 | 1 | 1 | 1 | <1 | 1 | 251 |
| Prior art 2 | — | 13 | 3 | 6 | 4 | 2 | 3 | 2 | <1 | 1 | 206 |
| Prior art 3 | — | 1 | 1 | 1 | 1 | 1 | 1 | 1 | <1 | 1 | 7 |
| Product for comparison | 730 | 1 | 1 | 1 | 1 | 1 | 1 | 1 | <1 | 1 | 131 |

TABLE 2

| Kind | Annealing condition: 120° C. × 30 min. annealing — Properties: Tensile strength (kg/mm²) | 0.2% proof stress (kg/mm²) | Elongation (%) | Electric conductivity (% IA CS) | 160° C. × 30 min. annealing — Tensile strength (kg/mm²) | 0.2% proof stress (kg/mm²) | Elongation (%) | Electric conductivity (% IA CS) |
|---|---|---|---|---|---|---|---|---|
| Present Invention 1 | 24.4 | 9.9 | 38.7 | 101.5 | 24.3 | 8.5 | 38.9 | 101.6 |
| Present Invention 2 | 24.6 | 9.7 | 37.1 | 101.1 | 24.4 | 8.6 | 37.6 | 101.2 |
| Present Invention 3 | 24.5 | 9.8 | 37.3 | 101.2 | 24.4 | 8.6 | 37.5 | 101.3 |
| Prior art 1 | 36.5 | 32.0 | 5.6 | 99.3 | 27.5 | 13.6 | 30.0 | 101.0 |
| Prior art 2 | 43.3 | 39.1 | 2.3 | 98.1 | 31.0 | 27.3 | 11.3 | 99.8 |
| Prior art 3 | 44.3 | 40.5 | 3.7 | 98.9 | 32.0 | 27.9 | 6.0 | 99.9 |
| Product for comparison | 47.1 | 44.4 | 1.8 | 95.9 | 35.4 | 31.7 | 3.7 | 96.2 |

From Table 2 it can be seen that the alloy according to the present invention, as compared with tough-pitch copper and oxygen-free copper heretofore in use, is not inferior with respect to electric conductivity, can be softened at a lower temperature, and makes it possible easily to obtain soft conductors. Especially, it is noted that the alloy according to the present invention has a low 0.2% proof stress, which does not exceed 12 $kg/mm^2$ in any case.

EXAMPLE 2

Magnet wires were made in the following way: Cold-drawn wires of 0.32 mm diameter prepared in the same manner as in Example 1 were passed through a pre-annealer of a furnace length of 6 m and an intra-furnace temperature of 400° C., continuously at a line speed of 60 m/min. and polyurethane application and backing were effected by a process combined with this annealing process to coat the wires with a polyurethane film of 10μ thickness. All of the magnet wires obtained in this way had a beautiful appearance and had no defect in the coating film. The apparent mechanical properties of these wires are given in Table 3.

TABLE 3

| Kind | Properties: Tensile strength (kg/mm²) | 0.2% Proof stress (kg/mm²) | Elongation (%) |
|---|---|---|---|
| Present invention 1 | 22.4 | 7.6 | 38.8 |
| Present invention 2 | 22.5 | 7.9 | 37.2 |
| Present invention 3 | 22.6 | 8.0 | 36.9 |
| Prior art 1 | 22.6 | 13.0 | 33.3 |
| Prior art 2 | 22.8 | 15.6 | 25.4 |
| Prior art 3 | 23.0 | 14.4 | 26.9 |
| Product for comparison | 25.0 | 15.8 | 25.9 |

From Table 3 it can be seen the magnet wires according to the present invention, compared with those of prior art and for comparison, are magnet wires that have an especially small 0.2% proof stress and an excellent softness.

EXAMPLE 3

Cold-drawn conductors of 0.8 mm diameter were made by working on copper alloy of the compositions shown in Table 4 in the same way as in Example 1.

These cold-drawn conductors were coated with tin by hot dipping under the conditions shown in Table 5.

TABLE 4

| Kind | Analytic values (ppm) Ca | Fe | Ag | Sn | Pb | Ni | Co | As | Bi | Sb | O |
|---|---|---|---|---|---|---|---|---|---|---|---|
| Present invention 3 | 120 | 5 | 3 | 4 | 2 | 2 | 3 | 1 | <1 | 1 | 181 |
| Present invention 4 | 99 | 3 | 2 | 3 | 1 | 1 | 2 | 1 | 1 | 1 | 231 |
| Present invention 5 | 120 | 23 | 2 | 5 | 2 | 2 | 1 | 2 | 1 | 2 | 150 |
| Prior art 3 | — | 1 | 1 | 1 | 1 | 1 | 1 | 1 | <1 | 1 | 7 |
| Prior art 4 | — | 2 | 1 | 2 | 1 | 1 | 1 | 1 | 1 | 1 | 230 |
| Prior art 5 | — | 18 | 3 | 5 | 3 | 1 | 1 | 2 | 1 | 2 | 196 |
| Product for comparison | 730 | 1 | 1 | 1 | 1 | 1 | 1 | 1 | 1 | <1 | 131 |

TABLE 5

| | |
|---|---|
| Temperature of tin bath; | 280° C. |
| Dip length; | 50 cm |
| Line speed; | 120 m/min. |
| Dip duration; | 0.25 sec. |

TABLE 5-continued

| | |
|---|---|
| Thickness of tin plating; | 1 μ |
| Flux; | Aqueous solution of $NH_4Cl + ZnCl_2 + HCl$ |

Tests by the ammonium persulphide in accordance with JISC 3002, 8. (2), were carried out on these coated conductors, when all of them were found satisfactory.

These coated conductors were further subjected to measurement of electric conductivity and mechanical properties. The results of the measurement are shown in Table 6.

TABLE 6

| | Properties | | |
|---|---|---|---|
| Kind | Electric conductivity (% IACS) | Tensile strength ($kg/mm^2$) | Elongation (%) |
| Present invention 3 | 98.8 | 25.3 | 31.5 |
| Present invention 4 | 99.3 | 24.9 | 33.1 |
| Present invention 5 | 98.7 | 25.3 | 31.2 |
| Prior art 3 | 98.5 | 35.2 | 6.0 |
| Prior art 4 | 99.2 | 32.4 | 8.2 |
| Prior art 5 | 98.1 | 35.0 | 6.3 |
| Product for comparison | 95.1 | 37.5 | 4.3 |

From Table 6 it can be seen that the conductors according to the present invention conform to the specification of the JISC 3152 without being given a softening process previously, even where their diameter is not very small and prior art conductors of the same diameter cannot be softened.

EXAMPLE 4

Next cold-drawn conductors of 0.4 mm diameter prepared in the same way as in Example 3 were coated with solder by hot dipping under the conditions given in Table 7.

TABLE 7

| | |
|---|---|
| Kind of solder; | Eutectic solder |
| Temperature of solder bath; | 240° C. |
| Dip length: | 1.5 m |
| Line speed; | 60 m/min. |
| Dipping duration; | 1.5 seconds |
| Thickness of solder plating; | 5 μ |
| Flux; | Aqueous solution of $NH_4Cl + ZnCl_2 + HCl$ |

Tests by the use of ammonium persulphide in accordance with JISC 3002, 8. (2), were carried out on these coated conductors, when all of them were found satisfactory.

The apparent electric conductivity and mechanical properties of these conductors were measured, and the results of the measurement are shown in Table 8.

TABLE 8

| | Properties | | |
|---|---|---|---|
| Kind | Electric conductivity (% IACS) | Tensile strength ($kg/mm^2$) | Elongation (%) |
| Present invention 3 | 97.1 | 22.6 | 30.1 |
| Present invention 4 | 97.2 | 22.5 | 30.8 |
| Present invention 5 | 97.0 | 22.9 | 29.9 |
| Prior art 3 | 96.0 | 33.0 | 5.1 |
| Prior art 4 | 96.0 | 31.0 | 7.3 |
| Prior art 5 | 95.9 | 32.8 | 4.9 |
| Product for comparison | 93.0 | 35.1 | 3.9 |

From Table 8 it can be seen that properties conforming to the JISC 3152 can be obtained without a previous annealing treatment in the case of the plated conductors according to the present invention even where the temperature of the plating bath is not very high and a value of elongation that conforms to the JISC 3152 with plated conductors of prior art.

As has been stated, the conductors of alloys according to the present invention have an especially excellent softness without lowering their electric conductivity, because they contain 5–200 ppm of calcium. That is to say, soft conductors with a small proof stress can be obtained. They are useful especially for magnet wires which are used after winding, various types of conductors for machines and appliances, lead wires, etc. Furthermore, plated conductors made by coating the surface of these conductors with tin, lead or their alloy by hot-dipping have an advantage of being economical because they made it possible to soften the conductors at the same time as the plating is done even with heating for a short duration by the hot-dip plating and a lower temperature of the hot-dip plating bath, making it unnecessary to soften the conductors previously.

Furthermore, since the present invention makes it possible to lower the temperature of hot-dip plating baths, the speed of dissolution of conductors into the plating metal is slow, so that the plating metal may be used for a long time without replacement without deterioration of the properties of the plating metal. The present invention thus has such remarkable advantages when employed for industrial purposes.

What we claim:

1. A soft copper alloy conductor which consists essentially of 5–200 ppm of calcium, the balance being substantially copper, and a coating on the surface of the copper alloy conductor of at least one metal selected from the group consisting of tin, lead and their alloys.

2. The soft copper alloy conductor of claim 1 wherein said coating is made by hot dipping the conductor with at least one of the aforesaid metals selected from the aforesaid group.

3. The soft copper alloy conductor of claim 1 wherein the conductor has a 0.2% proof stress which is 12 $kg/mm^2$ or less.

4. The soft copper alloy conductor of claim 2 which contains 30–400 ppm of oxygen.

* * * * *